(12) United States Patent
Lai et al.

(10) Patent No.: US 10,698,376 B2
(45) Date of Patent: Jun. 30, 2020

(54) HIERARCHICAL WIRELESS POWER MANAGEMENT SYSTEM AND METHOD, AS WELL AS REMOTE CONTROL DEVICE AND SLAVE CONTROLLER USED THEREIN

(71) Applicant: TEAM YOUNG TECHNOLOGY CO., LTD., Taoyuan (TW)

(72) Inventors: Chien-Chou Lai, Taoyuan (TW); Tz-Min Lin, Taoyuan (TW); Ke-Fan Fan, Taoyuan (TW); Dy-Cheng Wang, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 157 days.

(21) Appl. No.: 15/804,482

(22) Filed: Nov. 6, 2017

(65) Prior Publication Data

US 2018/0335762 A1 Nov. 22, 2018

(30) Foreign Application Priority Data

May 19, 2017 (TW) .............................. 106116768 A
Aug. 21, 2017 (TW) .............................. 106128311 A (51) Int. Cl.
*H02J 13/00* (2006.01)
*G05B 19/042* (2006.01)
(Continued)

(52) U.S. Cl.
CPC .......... *G05B 19/0421* (2013.01); *H02J 13/00* (2013.01); *H04L 12/282* (2013.01);
(Continued)

(58) Field of Classification Search
CPC ....................................................... H02J 13/00
See application file for complete search history.

(56) References Cited

U.S. PATENT DOCUMENTS 7,683,755 B2 3/2010 Ostrovsky et al.
7,756,556 B2 7/2010 Patel et al.
(Continued)

FOREIGN PATENT DOCUMENTS

CN 101174360 A 5/2008
CN 101639975 A 2/2010
(Continued)

*Primary Examiner* — Mark A Connolly
(74) *Attorney, Agent, or Firm* — Muncy, Geissler, Olds & Lowe, P.C.

(57) ABSTRACT

A hierarchical wireless power management system using a remote control device to control multiple slave controllers is disclosed. The control module of the remote control device comprises a processing circuit, a wireless signal transmission circuit, and a storage unit. The wireless signal transmission circuit is adapted for transmitting a control signal to a corresponding slave controller. The storage unit is storing settings related to the slave controllers. The remote control device manage the operations of slave controllers with a capability of doing a group controlling under the hierarchical architecture, based upon settings comprising a hierarchical grouping distribution architecture changeably set by a managing user and respective corresponding identification codes of the slave controllers set by the managing user.

12 Claims, 4 Drawing Sheets

(51) Int. Cl.
*H04L 12/28* (2006.01)
*H04L 12/24* (2006.01)

(52) U.S. Cl.
CPC ........ *H04L 12/2818* (2013.01); *H04L 41/044* (2013.01); *H04L 41/12* (2013.01); *G05B 2219/2231* (2013.01); *G05B 2219/2642* (2013.01)

(56) References Cited

U.S. PATENT DOCUMENTS

| | | | |
|---|---|---|---|
| 2008/0258563 A1* | 10/2008 | Hodges | H01R 13/7038 307/112 |
| 2011/0177780 A1* | 7/2011 | Sato | H04W 36/14 455/41.1 |
| 2013/0169168 A1 | 7/2013 | Lin et al. | |
| 2014/0070926 A1 | 3/2014 | Shan | |
| 2014/0098247 A1* | 4/2014 | Rao | H04W 4/20 348/207.1 |
| 2015/0028998 A1 | 1/2015 | Billig et al. | |
| 2015/0312210 A1 | 10/2015 | Tai | |

FOREIGN PATENT DOCUMENTS

| | | |
|---|---|---|
| CN | 102594574 A | 7/2012 |
| CN | 102724786 A | 10/2012 |
| CN | 102843315 A | 12/2012 |
| CN | 203276519 U | 11/2013 |
| CN | 103037581 B | 2/2016 |
| CN | 105657073 A | 6/2016 |
| CN | 105988446 A | 10/2016 |
| JP | 2002185628 | 6/2002 |

\* cited by examiner

HIERARCHICAL WIRELESS POWER MANAGEMENT SYSTEM AND METHOD, AS WELL AS REMOTE CONTROL DEVICE AND SLAVE CONTROLLER USED THEREIN

BACKGROUND OF THE INVENTION

1. Field of the Invention

The present invention relates to a power management technology and more particularly to a hierarchical wireless power management system and method, as well as a remote control device and a slave controller used therein.

2. Description of the Related Art

In a conventional arrangement, a power line wiring in a house must consider positions of power switches so as to provide a convenient operation to a user, and most of the power switches are configured to a control matching of one to one or multiple to one for respective appliances. For example, for the lighting in a house, a power switch is used to control a lamp or a number of lamps. Sometimes, multiple power switches are also used to control one or more lamps. However, the wiring for this kind of control matching not only needs to fulfill a distance of the power line to the lamp, but also needs to fulfill a distance from the lamp to the power switch. Moreover, once the wiring was completed, it is not easy to change the positions of the power switches or sockets, which in turn results in an inconvenient situation.

Furthermore, most of the factories or commercial buildings are spacious, and the power switches are scattered over many places. Sometimes, for a new managing person, it is not easy to find all of the power switches, and thus results in a problem to manage power.

Currently, there are some power management methods that allow managers to manage power connections in a configuration of a host and its network-connected slave controllers by means of hand-held devices. In this kind of management methods, a machine code or identification code of a slave controller is set during manufacturing in factory, and the identification code cannot be arbitrarily changed by the users. This kind of management methods thus have a problem that the scope of applying remote control is not easy to be expanded, and a multi-level management is not able to be achieved. Moreover, the signal transmission by means of network may be not worktable when the network connection fails, the way through network is thus easy to become an unstable factor for power management.

SUMMARY OF THE INVENTION

The present invention has been accomplished under the circumstances in view of the aforesaid. It is a main object of the present invention to provide a hierarchical wireless power management system, which can be performed without through a network, omitting the conventional power switches and reducing the use of power lines.

To achieve this and other objects of the present invention, a remote control device is provided for controlling a plurality of slave controllers adapted for a number of appliances in one or more buildings. The remote control device comprises an input module for receiving a selection signal, and a control module for generating a control signal for wireless control to, based upon the selection signal and settings comprising a hierarchical grouping distribution architecture changeably set by a managing user and respective corresponding identification codes of the slave controllers set by the managing user, manage the operations of slave controllers with a capability of doing a group controlling under the hierarchical architecture. The remote control device further comprises a display electrically coupled to the control module for displaying a selection, and a power supply device electrically coupled to the control module and the display. The control module comprises a processing circuit, a wireless signal transmission circuit and a storage unit. The wireless signal transmission circuit is electrically coupled to the processing circuit, and adapted for transmitting the control signal to a corresponding slave controller according to the selection. The storage unit is electrically coupled to the processing circuit for storing the settings related to the slave controllers.

To achieve this and other objects of the present invention, the present invention also provides a slave controller. The slave controller comprises a power input connector, a write-in interface for allowing a managing user to input a randomly generated identification code for the slave controller, and an operating unit connecting the power input connector and the write-in interface. The operating unit comprises a signal processing circuit, a switching circuit and a wireless signal receiver circuit. The signal processing circuit is adapted for storing the identification code. The switching circuit connects the signal processing circuit and the power input connector. The wireless signal receiver circuit is adapted for receiving a control signal corresponding to the identification code, and electrically connected to the signal processing circuit. The signal processing circuit is adapted for regulating the operation of the switching circuit and doing an output according to the control signal.

To achieve this and other objects of the present invention, the present invention also provides a hierarchical wireless power management system, which comprises the above-described remote control device and slave controllers.

To achieve this and other objects of the present invention, the present invention also provides a remote control management method for controlling the operation of a plurality of slave controllers in a hierarchical architecture. The remote control management method comprises a receiving step for receiving a selection signal, and a control step for generating a control signal for wireless control to, based upon the selection signal and settings comprising a hierarchical grouping distribution architecture changeably set by a managing user and respective corresponding identification codes of the slave controllers set by the managing user, manage the operations of slave controllers with a capability of doing a group controlling under the hierarchical architecture.

Thus, the managing user can freely and flexibly increase or reduce the number of hierarchical groups without worrying about the wiring configuration of the power lines, and can also control the slave controllers individually or in a hierarchical group. Moreover, the managing user needs not to remember or edit the identification codes of the slave controllers. The system itself can randomly generate the identification codes. Through the remote control device, the managing user can intuitively and easily controls the power supply status of each group of slave controllers or appliances, and the wireless control can be achieved without through the internet.

Other advantages and features of the present invention will be fully understood by reference to the following specification in conjunction with the accompanying drawings, in which like reference signs denote like components of structure.

DETAILED DESCRIPTION OF THE INVENTION

The constituent elements of the hierarchical wireless power management system of the present invention and the effects of the present invention will now be described with reference to the annexed drawings, wherein the components, the size and the appearance of the hierarchical wireless power management system are only intended to illustrate the technical features of the present invention and are not intended to limit the present invention.

The hierarchical wireless power management system does not achieve power management through a network such as power network, communication network, wireless network (WiFi) or local area network. The hierarchical architecture of the slave controllers used in the present invention is free to be increased and decreased in size of a hierarchical group and is not constrained by the locations of indoor switches and sockets. The number of the power lines can be reduced.

The hierarchical wireless power management system can be used to control the power supply to many kinds of electrical appliances, such as sockets, electronic locks, motor switches, lamps, loudspeakers, air conditioners, electric fans, electronic gates and audio and video equipments etc. in a school, shopping mall, sports field, factory or home. The "control" means the operation of turning on/off the power supply, or regulating the rate of the power supply to the electrical appliance. The motor switch may be used to control the forward and reverse rotation of a motor, in particular a motor used for rolling a roll-up door or an electric curtain.

Figure 1:
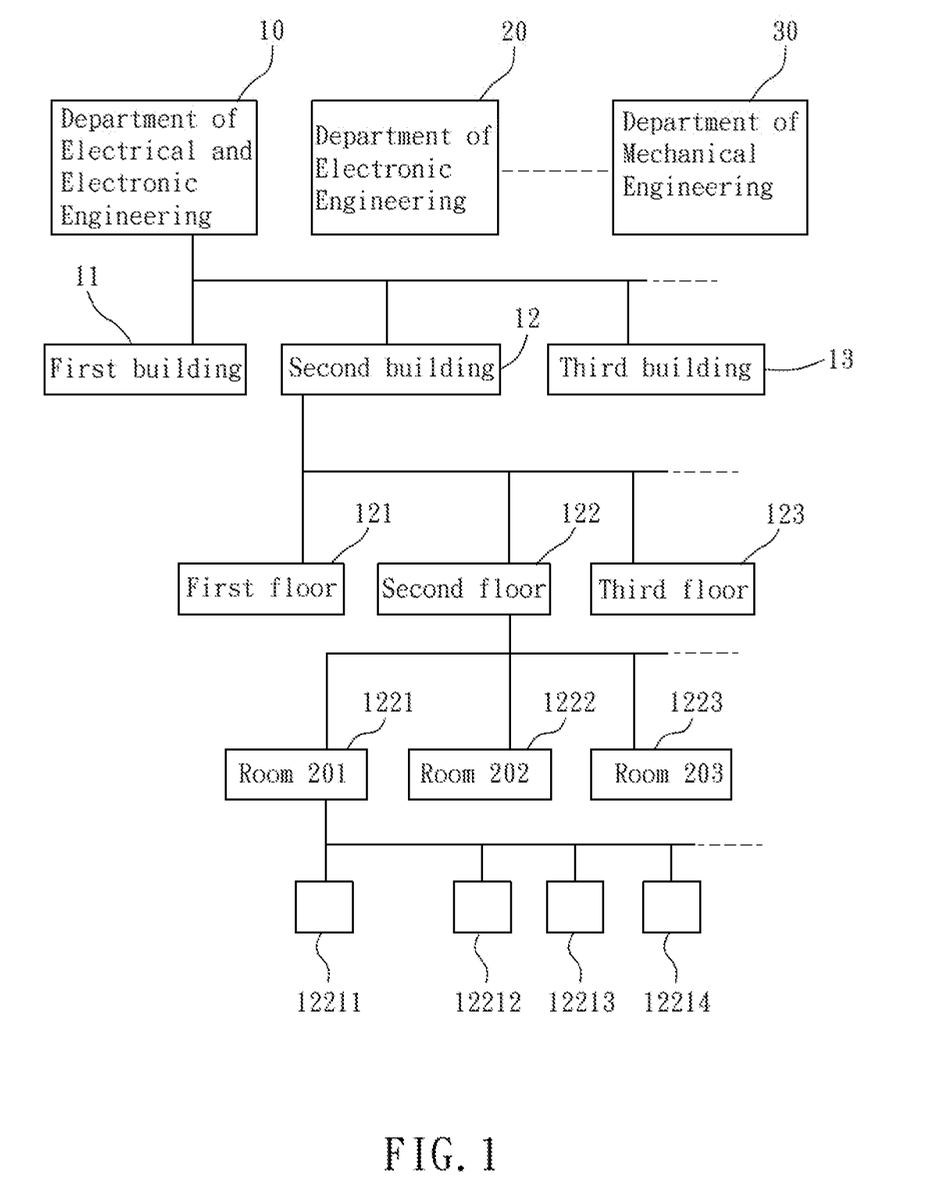
FIG. 1 illustrates an exemplary hierarchical architecture of salve controllers adapted for appliances in a school in accordance with the present invention.

Taking school as an example, the hierarchical architecture used in the present invention is illustrated in FIG. 1. In this embodiment, the area to be applied for the hierarchical architecture is a school, the power supply for all electrical appliances in the school is classified with the hierarchical architecture, and the hierarchical architecture may include a plurality of hierarchical groups. For example, a number of departments are defined as the highest hierarchical groups, referenced by 10, 20, and 30. A number of buildings in one department 10 are defined as secondary highest hierarchical groups, referenced by 11, 12, and 13. A number of floors in one building 12 are defined as middle-level hierarchical groups, referenced by 121, 122, and 123. A number of classrooms or spaces in one floor 122 are defined as smaller-level hierarchical groups, referenced by 1221, 1222, and 1223. At final, a number of spatial divisions in one classroom 1221 can be defined as smallest-level-level hierarchical groups, referenced by 12211, 12212, 12213, and 12214 and so on.

The hierarchical groups that are not expanded in FIG. 1 can be classified or defined into multiple hierarchical groups of different levels. The hierarchical group planning described above is not a limitation. In this embodiment, the hierarchical groups are illustrated as relating to power supply in the area. The groups in the area can also be a number of electrical appliances or a same type of electrical appliances. For example, the smallest-level hierarchical group 12211 comprises one or multiple electrical sockets; the smallest-level hierarchical groups 12212, 12213 respectively comprise different amounts of lamps; the smallest-level hierarchical group 12214 comprises one or multiple electrical fans; and the smaller-level hierarchical group 1221 comprises all the electrical appliances of the smallest-level hierarchical groups 12211-12214. That is, the power supply to the smallest-level hierarchical groups 12211-12214 can be controlled through controlling the power supply to the smaller-level hierarchical group 1221.

The hierarchical wireless power management system comprises a plurality of slave controllers 50 and a remote control device 70. These slave controllers 50 are respectively electrically connected with the individual electrical appliances (not shown) in the aforesaid hierarchical groups of the hierarchical architecture for controlling the operation of the respective electrical appliances, including switching or action. The settings of the hierarchical groups of the hierarchical architecture are determined according to the installation locations or functions of the slave controllers 50. Every individual slave controller 50 can appear in different hierarchical groups to achieve different control purposes or needs. The application and connection of the slave controllers 50 will be explained later. The remote control device 70 is adapted for generating a wireless control signal for controlling one slave controller 50 or a number of the slave controllers 50, driving the slave controller 50 or the multiple slave controllers 50 to regular its or their power output ratio and action.

The remote control device 70 allows the managing user to do settings related to the hierarchical architecture of the slave controllers by means of the remote control device 70 itself and to store the settings, and can also receive and store hierarchical architecture settings that were made by the managing user from an external device. These settings related to the hierarchical architecture can, for example, comprise definitions of the appliances associated to these slave controllers, corresponding identification codes thereof, and allocated hierarchical groups in the hierarchical architecture. The definitions of the slave controllers can be the names or model codes of the appliances connected to respective slave controllers that the user can intuitively identify. The settings of the hierarchical architecture can also include a setting for management authority. The remote control device can be used for doing an authorized management to the hierarchical groups in the hierarchical architecture that are authorized to be managed according to the management authority setting. Furthermore, the authority of one hierarchical group in the hierarchical architecture is preferred to include authorities to subgroups in such a hierarchical group.

The remote control device 70 controls the switching or action state of the slave controllers 50 under a hierarchical architecture mode according to the settings of the hierarchical architecture related to the slave controllers, and can do a hierarchical group control according to the hierarchical architecture. For example, the remote control device 70 can control the slave controller 50 to do a turn ON or OFF action by means of a control signal. Furthermore, the remote control device 70 can also execute a local ON/OFF control to directly control an adjacent slave controller 50 without a selection on the nearby slave controller 50. Under this function, the transmission power of such a control signal from the remote control device 70 is lower than the transmission power of a general control signal for controlling one particular selected slave controller. This function can also be set to be only applicable to the slave controllers in one selected or particular hierarchical group of the hierarchical architecture.

Figure 2:
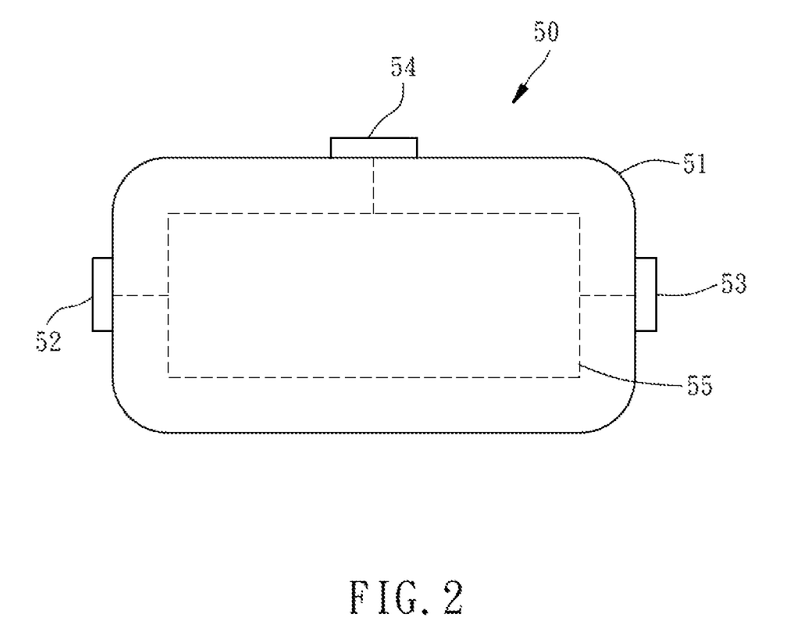
FIG. 2 illustrates the outer appearance of a slave controller in accordance with the present invention.
Figure 3:
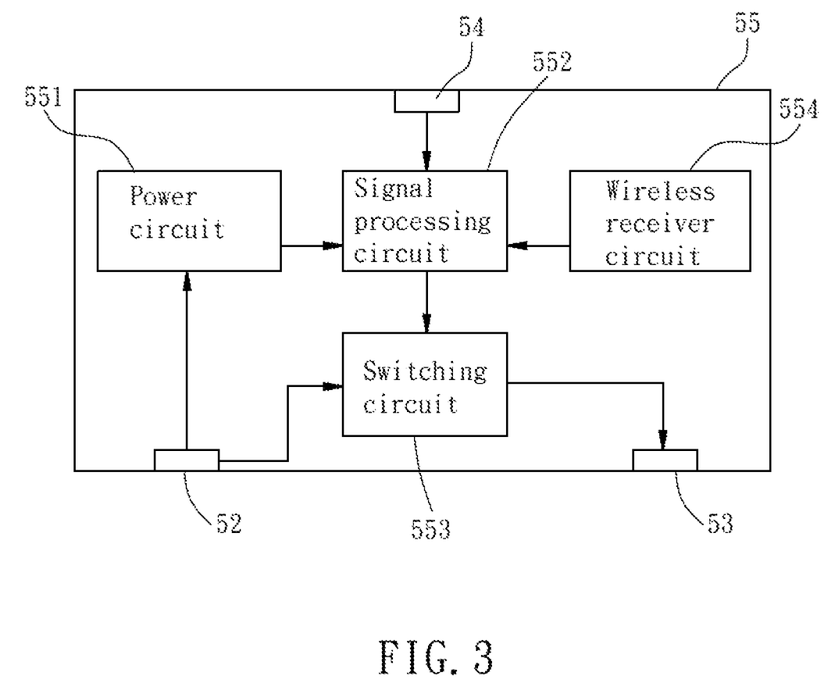
FIG. 3 is a circuit block diagram of the slave controller in accordance with the present invention.

Referring to FIG. 2 and FIG. 3, FIG. 2 illustrates the outer appearance of the slave controller 50 and FIG. 3 illustrates the circuit block diagram of the slave controller 50. As illustrated, the slave controller 50 comprises a housing 51, a power input connector 52, a power output connector 53, a write-in interface 54, and an operating unit 55. The operating unit 55 is mounted inside the housing 51. The power input connector 52, the power output connector 53 and the write-in interface 54 are respectively electrically connected to the operating unit 55. The power input connector 52 is for connection to a power cable. The power output connector 53 is adapted for connection to a power input terminal of an electrical appliance.

The operating unit 55 comprises a power circuit 551, a signal processing circuit 552, a switching circuit 553 and a wireless signal receiver circuit 554. The power circuit 551 is electrically coupled with the power input connector 52 and the signal processing circuit 552. The switching circuit 553 connects the signal processing circuit 552, the power input connector 52 and the power output connector 53. The wireless signal receiver circuit 554 is electrically connected to the signal processing circuit 552, and adapted for receiving a control signal having a corresponding identification code.

The signal processing circuit 552 controls the operation of the switching circuit 553 according to the control signal, thereby controlling the ratio of the power in the power cable output to the power output connector 53, or causing the switching circuit to generate an output for an action of the appliance. The ratio of the power output includes non power output, full power output, or a specific percentage of power output. The specific percentage of power output can be controlled by means of phase control or other known method. Since the control method is of the known art, its detailed description is omitted hereby.

The signal processing circuit 552 is electrically coupled with the write-in interface 54, and can store an identification code that is randomly set by the managing user and received through the write-in interface. The identification code stored in the signal processing circuit 552 can be deleted, and a new identification code can be written into the signal processing circuit 552 through the write-in interface 54. Furthermore, in this embodiment, the slave controller 50 does not need to send out its identity information before receiving the assigned identification code, and the randomly set identification code can be immediately transmitted to the slave controller 50 in the initial stage.

Figure 4:
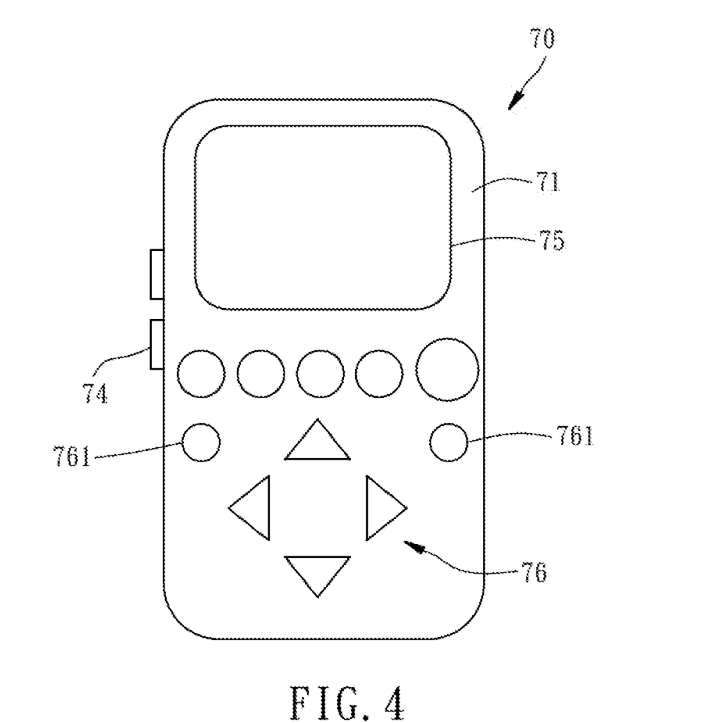
FIG. 4 illustrates the outer appearance of a remote control device in accordance with the present invention.
Figure 5:
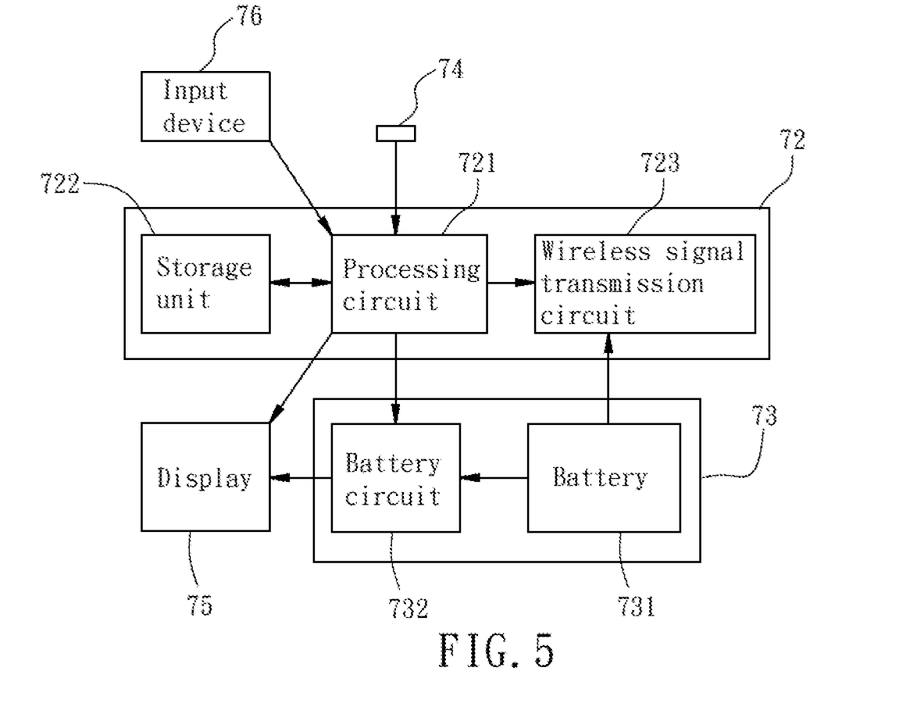
FIG. 5 is a circuit block diagram of the remote control device in accordance with the present invention.

Referring to FIGS. 4 and 5, FIG. 4 illustrates an outer appearance of the remote control device 70 and FIG. 5 illustrates a circuit block diagram of the remote control device 70. The remote control device 70 comprises a casing 71, a control module 72, a power supply device 73, an input/output connection interface 74, a display 75 and an input device 76 working as an input module. The control module 72 and the power supply device 73 are mounted inside the casing 71. The control module 72 is electrically coupled with the power supply device 73, the input/output connection interface 74, the display 75 and the input device 76 respectively. The input device 76 can be a keyboard, button, microphone or touch control module. The touch control module can be assembled with the display 75 to create a touch display for data input and display.

The power supply device 73 is electrically coupled with the display 75, and comprises a battery 731 and a battery circuit 732 electrically coupled with the battery 731, so as to provide a necessary working power to the remote control device 70.

The control module 72 controls the hierarchical groups according to the management authority mentioned above, and comprises a processing circuit 721, a storage unit 722 and a wireless signal transmission circuit 723. The processing circuit 721 is electrically coupled with the power supply device 73, the storage unit 722, the input device 76, the display 75 and the wireless signal transmission circuit 723 respectively. The storage unit 722 is adapted for storing the settings for the slave controllers, including the hierarchical architecture, the identification codes of the slave controllers and the names (identity information) corresponding to the respective identification codes. The storage unit 722 further stores information about the management authority. The management authority defines a scope that can be controlled by the remote control device 70 under the hierarchical architecture. The scope can refer to the quantity of the hierarchical groups. The wireless signal transmission circuit 723 comprises an antenna and a RF circuit for transmitting and receiving RF signals.

The processing circuit 721 performs a hierarchical management according to the management authority, and generates a control signal in response to an input command (selection signal) from the input device 76. The wireless signal transmission circuit 723 is adapted for transmitting and receiving the control signal. The hierarchical architecture is the architecture shown in FIG. 1. Providing different management authorities to different remote control devices 70 enable the remote control devices 70 to perform different power supply managements according to respective defined authorities. In other words, multiple remote control devices with multiple authority scopes can be used for a same hierarchical architecture mentioned above.

The processing circuit 721 further comprises an identification code generating module for allowing the managing user himself to set identification codes for respective slave controllers and to drive the identification code generation module to randomly generate the identification codes. The identification codes are randomly generated by the identification code generation module itself. When the random numbers are up to tens of millions, the identification codes are very difficult to repeat. In this embodiment, the way to write an identification code to a slave controller is to connect the write-in interface of the slave controller and the input/output connection interface 74 of the remote control device 70 first, and then to enable the processing circuit 721 to write the identification code randomly generated by the identification code generation module into the signal processing circuit of the slave controller. Furthermore, the managing user can use the input device 76 of the remote control device 70 to give a name (identity information) to a corresponding slave controller, enabling the slave controller to be defined again.

Similarly, the identification code generation module can delete the identification code stored in the signal processing circuit of the slave controller. Therefore, the managing user can install a redefined slave controller in a newly planned hierarchical architecture for power management. In general, one skilled in the art could understand that the core of the control module described in this embodiment is to generate a control signal for wireless control to, based upon the selection signal and settings comprising a hierarchical grouping distribution architecture changeably set by a managing user and respective corresponding identification codes of the slave controllers set by the managing user, manage the operations of slave controllers with a capability of doing a group controlling under the hierarchical architecture. This core of the control module can also be implemented by incorporating a software of doing such a core into a general hardware.

Although, in this embodiment, the identification code is written into the slave controller through the remote control device 70, but the identification code may be written to the slave controller through another device, for example, by the computer after it is set thereby. Therefore, writing the identification code is not limited to be done by the remote control device, and the writing can be achieved by a wireless manner. The hierarchical architecture setting of the slave controllers may also be inputted by a computer, a mobile phone or a PDA, etc., and the finished settings of the hierarchical architecture of the slave controllers can be transmitted to the remote control device through the input/output connection interface 74 and be stored in the storage unit of the remote control device. Therefore, the setting of the hierarchical architecture of the slave controllers is not limited to be done by means of the remote control device. Therefore, whenever a name of a slave controller is to be input, managing user only needs to enter the name of the slave controller without arranging or knowing its ID. The user thus can intuitively change the name of the slave controller. In other words, the input/output connection interface 74 can transmit an identification code to a corresponding slave controller without knowing the identity information of the slave controller first, and can be used to input the settings and identifying information, such as names or model numbers, of the slave controllers that are set by the user The measure to transmit data to the remote control device through the input/output connection interface 74 can be achieved by a wired manner or a wireless manner, and this is a known technology, and thus is not described in details.

Figure 6:
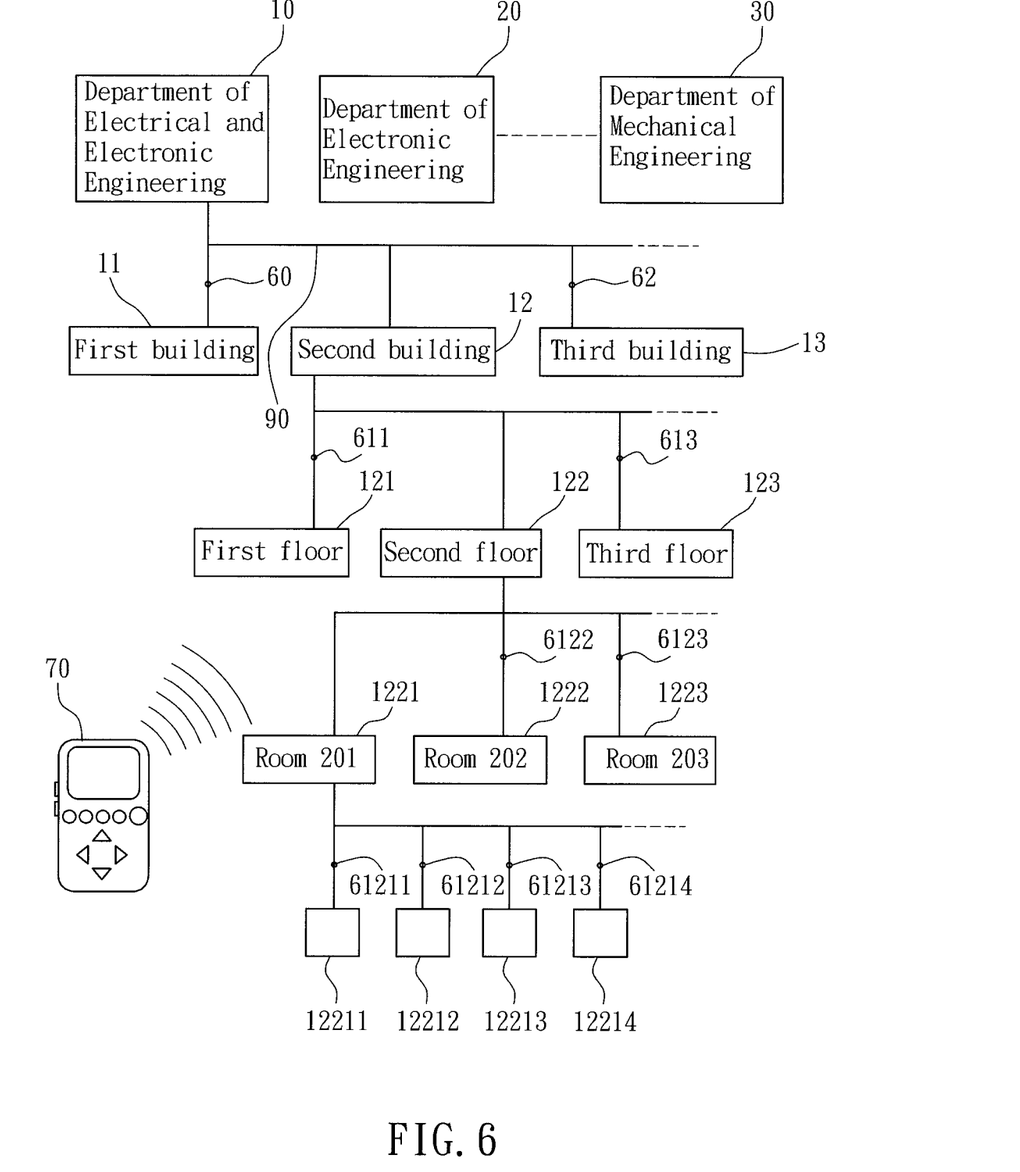
FIG. 6 is a schematic view of applying a hierarchical wireless power management system in accordance with the present invention.

Referring to FIG. 6, the remote control management method according to one embodiment of the present invention comprises the steps outlined hereinafter. At first, groups 11~12214 respectively corresponding to installation locations or functions of slave controllers 60-61214 are input so as to establish a hierarchical architecture, being a simplified wording of a "hierarchical grouping architecture," thereof. The hierarchical architecture defines the relationship of the slave controllers in the hierarchical architecture. FIG. 6 also shows a representative slave controller for each group in an end level so as to present respective slave controllers corresponding to respective groups in the end level. Each of the groups means a node. In this step, the managing user defines each slave controller and its group relationship. Thereafter, the managing user conducts a setting of an identification code for each slave controller. In this step, the managing user can use the above-described method to randomly generate respective identification codes for respective slave controllers, and can define corresponding names (definitions) for respective slave controllers using the remote control device 70 so as to complete and store the settings of the slave controllers (i.e., storing the name, identification code and corresponding hierarchical group for each slave controller). Thereafter, a number of selected controls are output by the remote control device 70. The operations of the slave controllers 60-61214 are thus controlled in accordance with the hierarchical architecture and the identification codes for respective slave controllers. In this step, user uses the remote control device 70 to control the power supply or operation status of a hierarchical group or a slave controller.

Therefore, each of the slave controllers can be increased or decreased by means of the remote control device itself or an external computer. In conclusion, the core of the remote control management method comprises a receiving step for receiving a selection signal, and a control step for generating a control signal for wireless control to, based upon the selection signal and settings comprising a hierarchical grouping distribution architecture changeably set by a managing user and respective corresponding identification codes of the slave controllers set by the managing user, manage the operations of slave controllers with a capability of doing a group controlling under the hierarchical architecture.

Furthermore, the remote control device 70 can work under a certain management authority. For example, a remote control device 70 having a highest management authority may manage all of the slave controllers. A remote control device 70 having a middle management authority can control the slave controllers in hierarchical groups 11, 12, and 13. That is, a remote control device 70 having an authority to hierarchical group 12 may control the slave controllers 611-61214, but not the slave controllers 60 and 62. Similarly, the management authority of a remote control device can be limited to a hierarchical group of one floor or a relatively smaller group. The scope of the management authority is not limited to that described in this embodiment. In other words, for a group that is not authorized to a remote control device, the remote control device cannot control such a group. Thus, different users with different remote control devices can perform different management controls under a same hierarchical architecture. Furthermore, each management authority setting can be set to be effective for a specific period of time.

In FIG. 6, all of the slave controllers 60-61214 are connected with power lines 90 and allocated at a front side of respective hierarchical groups 11-12214 for controlling the power supply to respective hierarchical groups 11-12214. For example, when the user uses the input device of the remote control device 70 to switch off the power supply to the hierarchical group 12211, the remote control device 70 emits a control signal having an identification code corresponding to slave controller 61211, and the wireless signal receiver circuit of the slave controllers within an effective control range of the remote control device 70 will receive the control signal having the identification code. However, only the signal processing circuit of the slave controller 61211 will cut off the power supply to the hierarchical group 12211 according to the control signal. All the sockets in this hierarchical group 12211 are turned off, and other slave controllers remain unchanged.

Furthermore, the present invention also provides a local switching control function for a direct local control. As illustrated in FIG. 4, the input device 76 of the remote control device 70 further comprises a local ON/OFF button 761. In this embodiment, when the remote control device 70 is put in a place in room #201 1221 of second floor 122, and a local ON/OFF button in the remote control device 70 is pushed to do a local switching control function, the local control signal of the remote control device 70 will be sent to all slave controllers within a selected hierarchical group. However, the transmission power of this local control signal is lower than that of a normal control signal for controlling a specifically selected slave controller. This local control signal is effective only to a slave controller, preferred within a selected hierarchical group, within the room #201 1221 of second floor 122. In this situation, the remote control device 70 can directly control a specific slave controller near or adjacent to the remote control device 70 without through a selection to the specific slave controller adjacent thereto. For example, a switching state of the slave controller 61211 near the remote control device 70 can be controlled. In this embodiment, the distance for the so-call "near or adjacent" could be 1-3 meters. However, this distance is not limited to the distance illustrated in this embodiment. Furthermore, the number of slave controllers to be effectively controlled is determined subject to the actual effective distance of the wireless local control signal and the selected hierarchical group. Of course, as a variant example, it is also possible to effect a control to a slave controller by means of distance condition only regardless a selection to a hierarchical group. In this case, the effective range of the local control signal for this local switching control function must be properly adjusted.

In this embodiment, the control signal of the remote control device 70 is preferably a RF signal. RF signals have better penetration and can travel far distances, so they can cover a larger space. Furthermore, the wireless control according to this embodiment of the present invention needs not to be established on a network architecture, its implementation is relatively simple and direct and will not be hacked. In particular, the identification code according to this embodiment of the present invention is randomly generated by the control device in a random manner. It may provide millions of different random codes. Therefore, this method is advantageous for slave controllers that require a safety consideration.

In view of the above, the slave controller uses an identification code randomly provided by a managing user through a remote control device, without a need to preset such an identification code during manufacturing. Thus, the wireless hierarchical power management system of the present invention is more flexible, easy to be expanded than the conventional designs, and can reduce the probability of duplicate identification codes. Moreover, the managing user can limit the scope of the authorized management in a certain remote control device subject to the setting of the authority in the remote control device. The user can use the remote control device to execute hierarchical group power control, and the problem in convention designs that needs to find the switch corresponding to the appliance to be controlled is resolved, and the use of power lines is reduced.

Although a particular embodiment of the present invention has been described in detail for purposes of illustration, various modifications and enhancements may be made without departing from the spirit and scope of the invention. Accordingly, the invention is not to be limited except as by the appended claims.

What is claimed is:

1. A remote control device for controlling a plurality of slave controllers, said remote control device comprising:
   an input module for receiving a selection signal resulted from a selection to at least one selected slave controller on settings that are stored in the remote control device, related to the plurality of slave controllers, and have identification codes corresponding to the slave controllers; and
   a control module for generating a control signal containing at least one identification code for the at least one selected slave controller to wirelessly control operations of the at least one selected slave controller based upon the selection signal and the settings,
   wherein the settings comprises a hierarchical grouping architecture consisted of a plurality of nodes defined by a managing user for controlling the slave controllers, and a plurality of identification codes for the plurality of nodes each in its entirety being a random number that is automatically set by following a setting of a node and is able to be identified for at least one of the slave controllers,
   wherein the plurality of identification codes is transmitted to the slave controllers under an exemption of receiving identity information of the slave controllers therefrom.

2. The remote control device as claimed in claim 1, further comprising:
   a display electrically coupled to said control module for displaying a selection; and
   a power supply device coupled to said control module and said display, said control module comprising a processing circuit, a wireless signal transmission circuit and a storage unit, said wireless signal transmission circuit being coupled to said processing circuit and adapted for transmitting said control signal to a corresponding slave controller according to the selection signal, said storage unit being coupled to said processing circuit for storing the settings related to the slave controllers.

3. The remote control device as claimed in claim 1, wherein said identification codes comprise individual identification codes for nodes corresponding to respective slave controllers and a group identification code for a node corresponding to a group to which the slave controllers belong in the hierarchical grouping architecture.

4. The remote control device as claimed in claim 3, wherein said control module further comprises an identification code generation module for randomly generating said individual and group identification codes of said slave controllers to be set into the settings and written into said slave controllers correspondingly.

5. The remote control device as claimed in claim 1, wherein the settings of said slave controllers include a hierarchical management authority for allowing said control module to manage certain hierarchical groups in said hierarchical grouping architecture according to the hierarchical management authority.

6. The remote control device as claimed in claim 1, further comprising an input/output connection interface adapted for setting a control relationship with the slave controllers, and adapted for being input the settings of said slave controllers.

7. The remote control device as claimed in claim 1, wherein said control module further comprises a local switching control function for directly controlling a slave controller near to the remote control device using a control signal activated by a local button that is irrelevant to any selection for the slave controllers.

8. The remote control device as claimed in claim 7, wherein a transmission power of the control signal of said remote control device in said local switching control function is lower than that of a control signal for controlling a specifically selected slave controller.

9. The remote control device as claimed in claim 7, wherein said local switching control function is limited to the slave controllers in one specific hierarchical group of said hierarchical grouping architecture.

10. A slave controller, comprising:
    a power input connector;
    a write-in interface for allowing a managing user to input an identification code for the slave controller; and an operating unit connecting said power input connector and said write-in interface, said operating unit comprising a signal processing circuit, a switching circuit and a wireless signal receiver circuit, said signal processing circuit being adapted for storing said identification code, said switching circuit connecting said signal processing circuit and said power input connector, said wireless signal receiver circuit being adapted for receiving a control signal corresponding to said identification code and electrically connected to said signal processing circuit, said signal processing circuit being adapted for regulating the operation of said switching circuit and doing an output according to said control signal, wherein the identification code in its entirety is a random number that is set automatically by following a setting of a node in a hierarchical grouping architecture defined by a managing user for controlling the slave controller and is able to be identified for the slave controller, wherein the identification code is inputted to the slave controller under a control of the managing user and an exemption of providing identity information of the slave controller thereby.

11. The slave controller as claimed in claim 10, wherein said identification code is one of an individual identification code of the slave controller and a group identification code indicating a group to which the slave controller belongs in the hierarchical grouping architecture.

12. A hierarchical wireless power management system, comprising:

a plurality of remote control devices as claimed in claim 1; and a plurality of slave controllers each comprising:

a power input connector;

a write-in interface for allowing a managing user to input an identification code for the slave controller; and an operating unit connecting said power input connector and said write-in interface, said operating unit comprising a signal processing circuit, a switching circuit and a wireless signal receiver circuit, said signal processing circuit being adapted for storing said identification code, said switching circuit connecting said signal processing circuit and said power input connector, said wireless signal receiver circuit being adapted for receiving a control signal corresponding to said identification code and electrically connected to said signal processing circuit, said signal processing circuit being adapted for regulating the operation of said switching circuit and doing an output according to said control signal, wherein the plurality of remote control devices comprises a first and a second remote control devices, being provided with a first and a second hierarchical grouping architectures respectively, and the second hierarchical grouping architecture is a part of the first hierarchical grouping architecture so as to manage the part of the first hierarchical grouping architecture under authority.

* * * * *